United States Patent [19]
Jezwinski et al.

[11] Patent Number: 5,552,881
[45] Date of Patent: Sep. 3, 1996

[54] METHOD AND APPARATUS FOR SCANNING A FIBER OPTIC NETWORK

[75] Inventors: Scott D. Jezwinski, Buffalo Grove; Alan T. Weir, Gurnee; Jeffrey H. Schy, Deerfield, all of Ill.

[73] Assignee: Teradyne, Inc., Boston, Mass.

[21] Appl. No.: 210,315

[22] Filed: Mar. 17, 1994

[51] Int. Cl.$^6$ ................................................. G01N 21/88
[52] U.S. Cl. ................................................. 356/73.1
[58] Field of Search ................................................. 356/73.1

[56] References Cited

U.S. PATENT DOCUMENTS

| | | | |
|---|---|---|---|
| 4,497,575 | 2/1985 | Philipp | 356/73.1 |
| 4,749,247 | 6/1988 | Large | 356/73.1 |
| 4,812,038 | 3/1989 | Nazarathy et al. | 356/73.1 |
| 4,813,045 | 3/1989 | Culpepper | 372/38 |
| 4,885,547 | 12/1989 | Bell, Jr. et al. | 330/254 |
| 4,886,335 | 12/1989 | Yanagawa et al. | |
| 4,898,463 | 2/1990 | Sakamoto et al. | 356/73.1 |
| 4,911,515 | 3/1990 | So et al. | |
| 4,928,232 | 5/1990 | Gentile | 364/52.5 |
| 4,960,989 | 10/1990 | Liebenrood et al. | 250/227.15 |
| 4,968,880 | 11/1990 | Beller | 250/227.21 |
| 4,989,971 | 2/1991 | McDonald | 356/73.1 |
| 5,000,568 | 3/1991 | Trutna, Jr. et al. | 356/73.1 |
| 5,023,445 | 6/1991 | Goll et al. | 250/227.15 |
| 5,033,826 | 7/1991 | Kolner | |
| 5,046,832 | 9/1991 | Bell | 359/305 |
| 5,062,704 | 11/1991 | Bateman | 356/73.1 |
| 5,091,642 | 2/1992 | Chow et al. | 250/226 |
| 5,104,219 | 4/1992 | Bell | 356/73.1 |
| 5,142,284 | 8/1992 | Trent et al. | 341/122 |
| 5,148,230 | 9/1992 | Lane et al. | 356/73.1 |
| 5,155,439 | 10/1992 | Holmbo et al. | 324/534 |
| 5,185,635 | 2/1993 | Trent et al. | 356/73.1 |
| 5,359,192 | 10/1994 | Williams et al. | 250/227.23 |
| 5,359,683 | 10/1994 | Pan | 385/22 |
| 5,416,725 | 5/1995 | Pacheco et al. | 364/514 |

FOREIGN PATENT DOCUMENTS

| | | |
|---|---|---|
| 0379609 | 8/1990 | European Pat. Off. . |
| 2229881 | 10/1990 | United Kingdom . |
| WO94/16347 | 7/1994 | WIPO . |

OTHER PUBLICATIONS

Advertisement for Computer Product, publicly available prior to Mar. 17, 1993 (see accompanying Description of Advertisement for Computer Product).

*Primary Examiner*—Vincent P. McGraw

[57] ABSTRACT

In a method and apparatus for scanning a fiber optic network, a light source emits optical pulses into an optical fiber under test. A detector detects reflected light for each of the optical pulses and converts the reflected light into an electrical signal for each of the optical pulses. A sampling circuit samples the electrical signal for each of the optical pulses to generate sets of sample data points associated with the respective optical pulses. A signal processor is programmed to ensemble average the sets of sample points with each other to generate a merged set of avenge sample points. The signal processor then compresses the merged set of average sample data points to obtain a current set of trace data points. The data compression is preferably accomplished using "boxcar" time-avenging of the sample points. The current set of trace data points is compared with a reference set of trace data points stored in memory to determine whether or not a fault exists in the fiber under test.

15 Claims, 5 Drawing Sheets

METHOD AND APPARATUS FOR SCANNING A FIBER OPTIC NETWORK

FIELD OF THE INVENTION

The present invention relates generally to fiber optics and, more particularly, to a method and apparatus for scanning a fiber optic network which minimizes both the time for detecting a fault in the network and the mount of memory required to store sample dam.

BACKGROUND OF THE INVENTION

Many telephone companies are beginning to use automated systems for achieving monitoring, testing, and management objectives for their fiber optic networks. In such automated systems, optical time domain reflectometers (OTDR) are employed for testing optical fibers for attenuation, discontinuities, and faults, which affect the quality of optical signals transmitted through the fibers. In testing an optical fiber with an OTDR, a fiber under test is connected to the OTDR and a laser is periodically energized to launch light pulses into the fiber under test. During the interval between the pulses, backscattered light from the fiber produced by the Rayleigh effect and reflected light produced by discrete reflection sites (e.g., splices) are directed to a photosensitive detector, such as an avalanche photodiode or the like. The detector converts the backscattered light signal into an electrical signal, which is amplified, sampled, and stored in memory.

Each light pulse launched into the fiber under test generates a set of sample data points representing the power of the reflected light at different locations along the length of the fiber. Since variable noise accompanies the generation of each set of sample points, one set of sample points will vary from another set of sample points. In order to obtain trace data points for a "smooth" OTDR trace, the sets of sample points are "ensemble" averaged with each other by averaging corresponding sample points of the different sets with each other. The greater the number of sets of sample points, the smoother the ultimate OTDR trace obtained by ensemble averaging. Often, to perform an OTDR test as described above, several hundred thousand sets of sample points must be generated and ensemble averaged with each other. To detect a fault in the network, the results of a "current" OTDR test are compared to a stored OTDR reference trace.

The foregoing OTDR testing technique suffers from several drawbacks. Since every trace data point is stored in the memory, the storage capacity of the memory must be relatively large to accommodate the amount of information stored therein. In addition, for each fiber, the time for taking the OTDR test may range anywhere from fifteen seconds to three or more minutes. This amount of time is required to obtain an OTDR trace which is accurate enough for comparison with an OTDR reference trace. If there are hundreds or thousands of fibers in the fiber optic network, the amount of time for testing the entire network is quite large. If a particular fiber contains a break or is degrading optical performance, detection of the problem may occur long after the occurrence of the problem.

Consequently, a need exists for a method and apparatus for scanning a fiber optic network which overcomes the aforementioned shortcomings associated with existing OTDR testing techniques.

SUMMARY OF THE INVENTION

Accordingly, an object of the present invention is to provide a method and apparatus for scanning a fiber optic network which minimizes both the time for detecting a fault in the network and the amount of memory required to store trace data points.

In one particular embodiment, the foregoing objects are realized by providing a method and apparatus for scanning a fiber optic network. In this method and apparatus, a light source periodically emits a plurality of optical pulses into an optical fiber under test, and a detector receives reflected light generated by each optical pulse from the optical fiber. The detector converts the received light for each optical pulse into an electrical signal, and a sampling circuit samples the electrical signal in accordance with the length of the fiber to generate a set of sample data points. A signal processor is programmed to ensemble average the sets of sample points with each other to generate a merged set of average sample points. To ensemble average the sets of sample points with each other, the signal processor averages corresponding points of the sets of sample data points. The signal processor then compresses the number of sample points in the merged set to generate a predetermined number of trace data points (e.g., less than 256 trace data points) so as to minimize the amount of memory required to store data.

In the preferred embodiment, data compression of the merged set of sample points is accomplished using "boxcar" time-averaging of the sample points. This averaging technique divides the sample points into a plurality of groups with each group preferably, but not necessarily, containing an equal number of sample points. The sample points in each group are then averaged with each other to produce one current trace data point per group.

The current trace data points generated by data compression are compared with reference trace data points generated and stored in memory using the same operations for generating the current trace data points. If the difference between the trace data points and the reference trace data points is greater than a predetermined threshold, then an alarm condition is generated to indicate that a fault exists in the optical fiber.

The above summary of the present invention is not intended to represent each embodiment, or every aspect, of the present invention. This is the purpose of the figures and the detailed description which follow.

BRIEF DESCRIPTION OF THE DRAWINGS

Other objects and advantages of the invention will become apparent upon reading the following detailed description and upon reference to the drawings in which.

Figure 1:
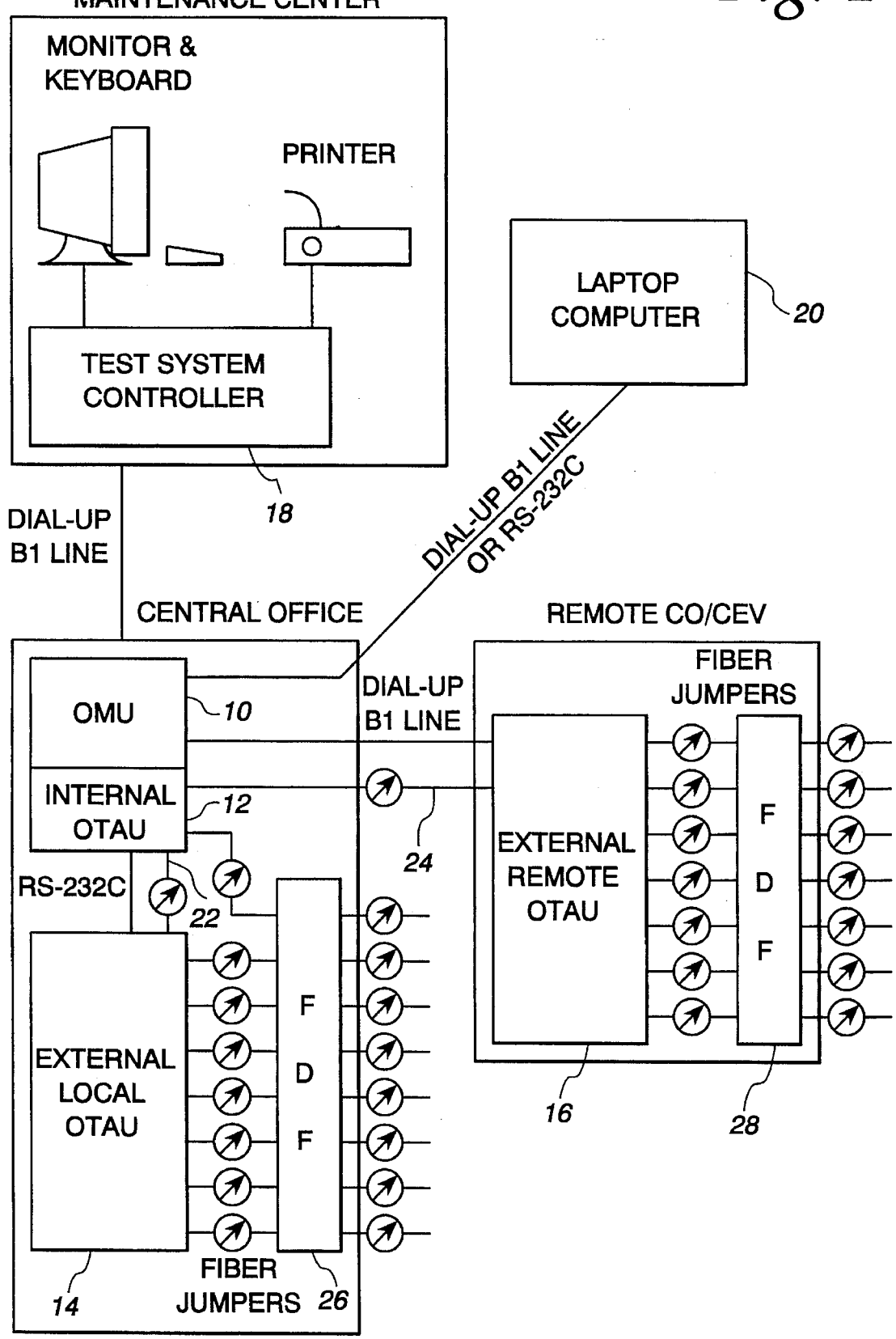
FIG. 1 is a block diagram of an automated system incorporating an apparatus for scanning a fiber optic network in accordance with the present invention.

While the invention is susceptible to various modifications and alternative forms, specific embodiments thereof have been shown by way of example in the drawings and will be described in detail. It should be understood, however, that it is not intended to limit the invention to the particular form described. On the contrary, the intention is to cover all modifications, equivalents, and alternatives falling within the spirit and scope of the invention as defined by the appended claims.

DETAILED DESCRIPTION OF THE PREFERRED EMBODIMENT

Turning now to the drawings, the present invention is discussed in the context of an exemplary automated system using a scanning apparatus and method embodying the principles of the present invention. The particular automated system illustrated and described (FIGS. 1 and 2) should not, however, be construed to limit the possible applications for the present invention, as these applications encompass a wide variety of automated systems for testing fiber optic networks. To fully appreciate the utility of the present invention, however, the automated system of FIGS. 1 and 2 will first be described, followed by a detailed description of the scanning apparatus and method embodying the present invention.

FIG. 1 illustrates a typical automated system installation incorporating the scanning apparatus and method of the present invention. The automated system is comprised of central office-based optical measurement units (OMUs) 10, software-controlled optical test access units (OTAUs) 12, 14, and 16, and a test system controller (TSC) 18 located in a maintenance or service center. Laptop computers 20 can also be configured to support TSC functionality. The automated system will support testing of up to fifty thousand fibers per TSC.

The TSC 18 is preferably a DOS or UNIX based computer that provides a graphics-based user interface, and the TSC 18 acts as the controller for the automated system. Software in the TSC 18 analyzes measurement data provided by the OMU 10, and then presents the interpreted results to the user. The TSC 18 also stores the information required for the fiber optics tests performed by the automated system. This includes site specific data describing the location of the OMUs 10 and OTAUs 12, 14, and 16, as well as the identification of each fiber connected to the test system. Usually installed in a maintenance or service center, the TSC 10 is preferably placed in an office-like environment.

Access to the automated system is also possible using a laptop computer 20 which has transparent interface software loaded onto it. In this case, the laptop computer 20 acts as a remote graphics terminal and has access to all of the capabilities and functions of the TSC 18. The laptop computer 20 can access the TSC 18 remotely through a conventional B1 dial-up line or data link.

The OMU 10 acts as the test head of the automated system and is the basic building block of the automated system. It is capable of performing both single-mode OTDR measurements and optical power measurements, and these measurements are preferably conducted at wavelengths of 1310 nm, 1550 nm, or some other wavelength chosen for the automated system. The OMU 10 is controlled by the TSC 18 via a high-speed modem over a voice grade line. Through this link, the OMU 10 receives its commands from the TSC 18 and sends back test results. In its standard configuration, the TSC 18 can support up to one thousand five hundred OMUs 10. In determining the location of faults in a fiber optic network, the fault location measurements of the OMU 10 are accurate to within four meters of the fault, plus or minus $1/10,000$ of the total distance to the fault from the OMU 10.

The OMU 10 is preferably a rack-mounted device installed in the central office, and it is powered by a conventional −48 volt DC office battery fused at 3 amperes. The housing of the OMU 10 is designed to comply with Bellcore's Network Equipment Building Specification (NEBS) standards for rack-mounted equipment. The OMU 10 houses an internal OTAU 12, and separate external local OTAUs 14 or remote OTAUs 16 may also be connected to the OMU 10. The OMU 10 supports both internal and external OTAUs simultaneously.

Each of the OTAUs 12, 14, and 16 acts as a single-mode optical switch in the automated system. As stated above, the internal OTAU 12 preferably includes 4, 8, 12, or 16 ports. The external OTAUs 14, 16 each preferably have 25, 50, 75, or 100 ports. In the automated system depicted in FIG. 1, the optical fibers of the fiber optic network terminate at fiber distribution frames (FDFs) 26, 28. The fiber distribution frame 26 is, in turn, connected to the internal OTAU 12 and the external local OTAU 14 using fiber jumpers, and the fiber distribution frame 28 is similarly connected to the external remote OTAU 16 using fiber jumpers.

The external OTAUs 14, 16 are rack-mounted devices that are placed in a central office, CEV, or other environment where fibers terminate. In FIG. 1, the external OTAU 14 is illustrated as being located in a central office, while the external OTAU 16 is illustrated as being located in a central office or CEV. The housings of the external OTAUs 14, 16 are designed to comply with NEBS standards for rack-mounted equipment, and they are each powered by a conventional −48 volt DC office battery fused at 3 amperes.

The external OTAUs 14, 16 are connected to the OMU 10 by respective fiber jumpers 22, 24. With respect to the external local OTAU 14, communication between the OMU 10 and the OTAU 14 is provided by an RS-232C cable. With respect to the external remote OTAU 16, communication between the OMU 10 and the OTAU 16 takes place over a conventional dial-up B1 line or data link.

Figure 2:
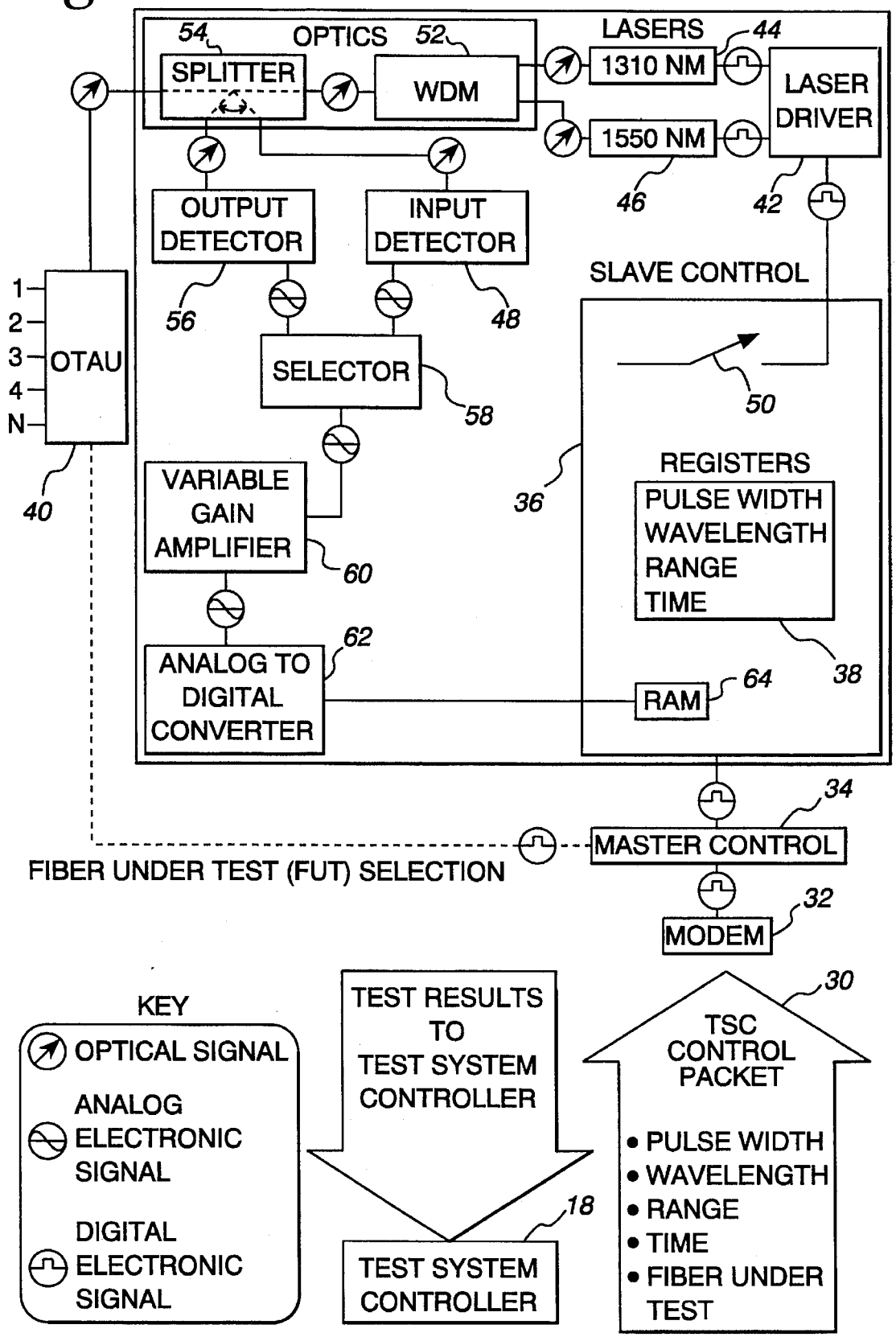
FIG. 2 is a detailed block diagram of the automated system in FIG. 1, showing the flow of optical, analog, and digital signals through the automated system.

FIG. 2 illustrates a detailed block diagram of the automated system in FIG. 1, showing the flow of optical, analog, and digital signals through the automated system in connection with both OTDR and optical power tests. First, with respect to OTDR tests, an OTDR test sends a pulse of light down an optical fiber span at a wavelength of either 1310 nm, 1550 nm, or some other wavelength, depending upon the wavelength chosen for the automated system. Since these wavelengths can be selected so that they do not interfere with wavelengths employed for communications, OTDR tests may be conducted on both dark/unused optical fibers and live/used optical fibers. The automated system then measures the size (amplitude) of any "event" (reflectance and drop in backscatter) it finds on the fiber span. The automated system pinpoints the location of these events by determining how long it takes light to travel down the optical fiber and return. In determining the location of events, the OTDR test takes into account the two-way travel time of the light and the index of refraction of the optical fiber.

More specifically, in the launch cycle of an OTDR test, the OTDR test is initiated by the TSC 18, which sends a control packet 30 through an OMU modem 32 to a master control 34. The control packet 30 specifies the testing parameters for each fiber connected to the testing system, including pulse width, wavelength, distance/range, test time, and fiber under test. The OMU modem 32 is preferably a 14,400 baud V.42 bis standard modem. The master control 34 is located on a CPU board within the OMU 10. The CPU board serves as the control function of the OMU 10, and the board preferably contains an Intel 80386 or 80486 microprocessor, a math coprocessor, and RAM and flash memory for executing its program.

The master control 34 forwards the TSC control packet 30 to a slave control 36. Elements of this packet 30 are stored as registers 38 for controlling the subsystem components that perform the OTDR Test. The master control 34 also informs the OTAU 40 which port will be used for the test. The OTAU 40 may be an internal OTAU (e.g., OTAU 12 in FIG. 1), an external local OTAU (e.g., OTAU 14 in FIG. 1), or an external remote OTAU (e.g., OTAU 16 in FIG. 1). The slave control 36 uses the registers 38 to set the testing parameters for a laser drive 42. The pulse width selection affects the amount of power the OMU 10 sends down the fiber under test. In the preferred embodiment, the pulse width ranges from 40 ns to 10 µs. The longer the pulse width (e.g., 10 µs), the longer the selected laser 44 or 46 stays on. The pulse width register signals the laser driver 42 to switch on and off the selected laser 44 or 46. Selecting a wavelength determines which of the two lasers 44 or 46 will be used for the test. The laser 44 operates at a wavelength of 1310 nm, and the laser 46 operates at a wavelength of 1550 nm. Alternatively, these lasers may operate at other wavelengths chosen for the automated system. The range value controls the time between laser pulses and is determined by the length of the fiber under test. In this way, it mitigates superposition or intermixing problems that occur when a new pulse is launched before the previous one has returned to an input detector 48. The range value also helps to determine the resolution and scale of the trace display. The test time register controls the amount of time the OMU 10 spends averaging the signal returning through the OMU input detector 48. The OMU 10 performs hundreds of tests per second and then ensemble averages the results before displaying them on screen. The longer the test time, the more averaging the system has time to perform, resulting in more accurate reporting of fiber events.

The more accurate reporting of fiber events, however, is achieved at the expense of these longer test times. As discussed in detail later, the novel scanning method embodying the present invention allows the automated system to detect a fault in a minimum amount of time. This is accomplished by reducing the test time so that the OMU 10 averages less tests together, and then manipulating the averaged results to compensate for the decreased number of tests and generate a smooth trace display. Although the decreased test time sacrifices the resolution of the trace display, the scanning method permits rapid determination of fiber faults.

In addition to the registers 38, the slave control 36 contains a safety switch 50 which turns off the laser 44 or 46 in response to opening the front door of the OMU 10. The laser 44 or 46 transforms the digital electrical signal received from the laser drive 42 into an optical light pulse. A wave division multiplexer (WDM) 52 channels the light pulse from either the 1310 nm or 1550 nm laser through a splitter 54. The splitter 54 directs a portion of the launched light to an output detector 56 for monitoring proper firing of the laser. The OTAU 40 directs the light pulse through the port identified by the master control 34.

In the receive cycle of an OTDR test, the OTAU 40 directs returning light from the previously launched light pulse through the splitter 54. The splitter 54 directs a portion of the returning light to the input detector 48, which transforms the optical signal into an analog electrical signal and routes it to a selector 58. The selector 58 determines which of the detector signals is sent to an amplifier 60, which magnifies the amplitude of the signal received from the input detector 48. An analog-to-digital converter 62 samples the analog signal received from the amplifier 60 and transforms it into a digital signal. It then sends this signal to the slave control 36 where it is stored in volatile RAM 64. The data stored in the RAM 64 is moved to the master control 34, where it is processed. When the test duration register in the slave control 36 indicates that the test is complete, the master control 34 sends an acknowledgement signal to the TSC 18. The TSC 18 returns a command to the master control 34 to send the test results, which it then does.

Next, with respect to optical power tests, an optical power test measures the optical power level at the OMU end of an illuminated fiber span. These measurements indicate the absolute power level detected at the OMU 10 from an external light source. The automated systems performs these tests at 1310 nm, 1550 nm, or other chosen wavelength, and records the results in dBm.

To conduct an optical power test, an external optical light source sends a pulse or continuous wave of light down a fiber towards the OMU 10. The splitter 54 directs a portion of the light to the input detector 48, which transforms the optical signal into an analog electrical signal and routes it to the selector 58. The selector 58 determines which of the detector signals is sent to the variable gain amplifier 60. The amplifier 60 magnifies the amplitude of the signal received from the input detector 48. Furthermore, in optical power tests the amplifier 60 also performs an automatic gain control function because the OMU 10 accepts readings which fit within acceptable tolerances of the OMU 10. This function is repeated a number of times until the analog signal falls within the acceptable range limits of the OMU 10. In particular, if the amplified signal exceeds these range limits, then data is lost when the signal is "clipped" by the range limiters. In response to detection of this clipping, the variable gain amplifier 60 dampens the amplified signal. If the dampened signal still exceeds the range limits, the variable gain amplifier 60 continues to dampen the signal until it fits within acceptable tolerances of the OMU 10. The amplifier 60 then sends the signal on to the analog-to-digital converter 62. The analog-to-digital converter 62 digitizes the analog signal and sends it to the slave control 36 where it is stored in the RAM 64. The stored data is then moved to the master control 34, where it is processed. Upon completion of the optical power test, the master control 34 sends a signal to the TSC 18 indicating that the test results are ready. The TSC 18 then requests the test results from the OMU 10, which responds by sending the results.

Figure 3A:
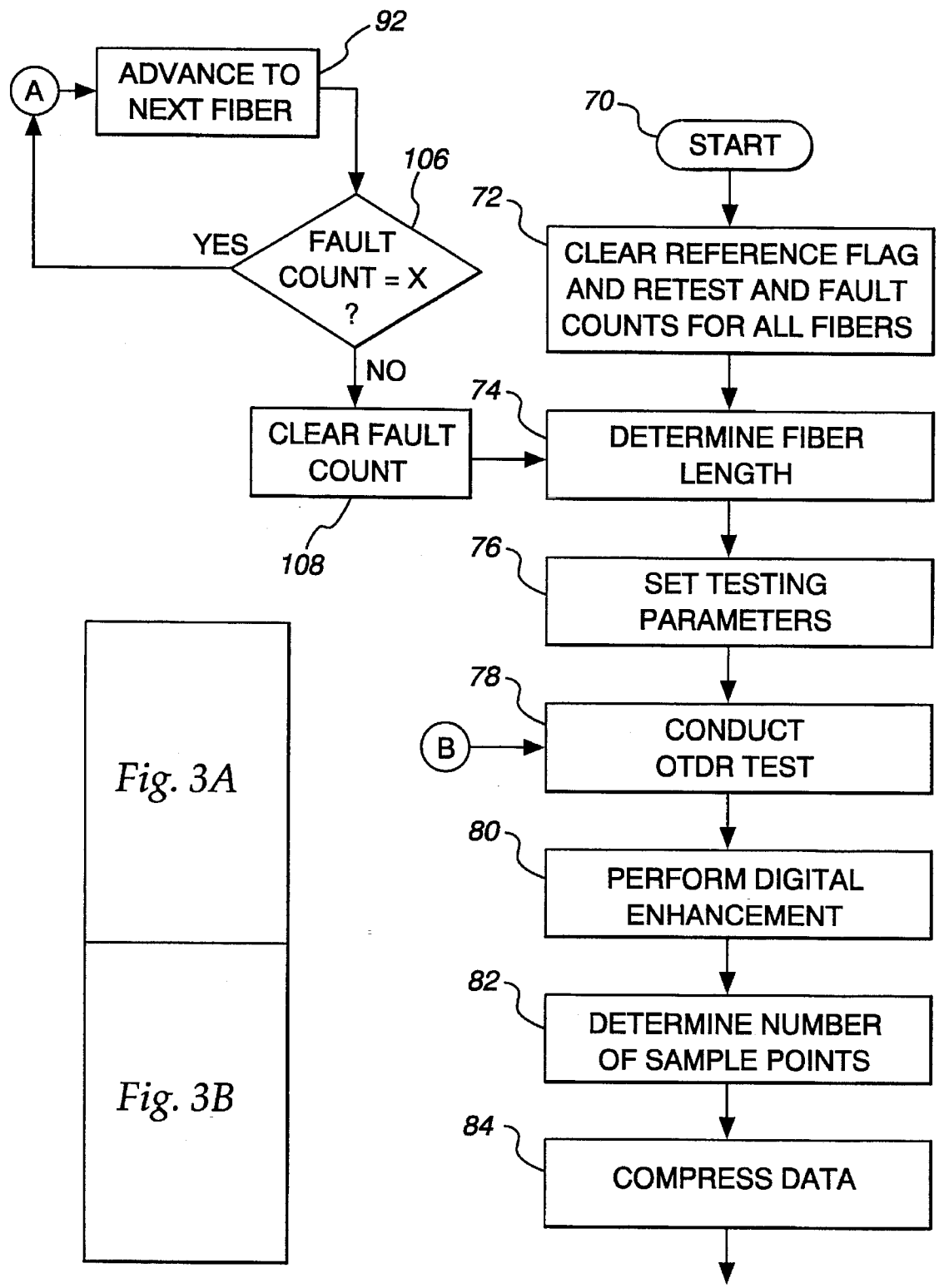
FIGS. 3A–B are flowcharts of the scanning method embodying the present invention.
Figure 3B:
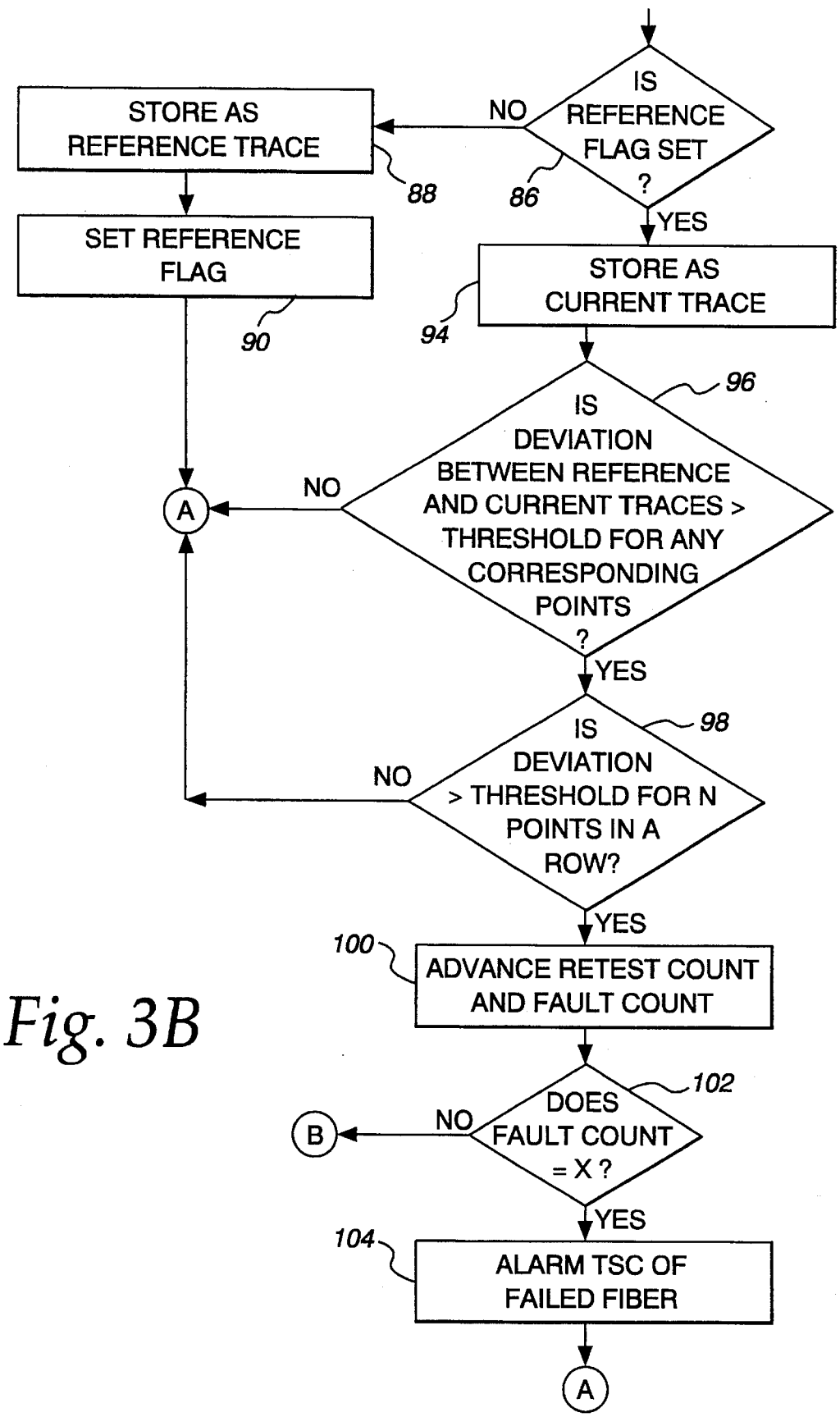

Referring now to FIGS. 3A–B, in order to reduce the test time for conducting an OTDR test without sacrificing the ability to accurately determine the existence of a fault in a fiber under test, the automated system employs the novel scanning method depicted in the flowcharts. Since the software for this scanning method is stored in flash memory located within the OMU 10, the OMU 10 can scan independently without constant communication with the TSC 18. The scanning method conducts OTDR tests and other operations for the optical fibers coupled to the OMU 10 in a round robin sequence. Alternatively, the scanning method prioritizes the optical fibers based on customer priority or the cable routing configuration. Each of these fibers has an associated reference flag, retest count, and fault count. The reference flag indicates whether or not a reference trace has been generated and stored for the fiber under test. Once a reference trace is stored for the fiber under test, the reference flag is set and future traces for that fiber are compared to the reference trace to locate faults in the fiber under test.

The fault count indicates the number of perceived faults in the fiber under test. Each time a fault is detected in the fiber under test, the fiber is immediately retested (not advance to next fiber) one or more additional times to confirm that a fault in fact does exist on that fiber. Retesting the fiber insures that a false indication of failure is not made for a good fiber. If the fault count reaches a predetermined number (e.g., three), then the OMU 10 alarms the TSC 18 that the fiber has failed and no more testing is conducted on the failed fiber. If, however, the fault count falls short of the predetermined number, the fault count is reset to zero so that the associated fiber has a "clean slate" for purposes of causing an alarm condition the next time the fiber is tested as part of the round robin sequence.

The retest count indicates the number of retests conducted due to perceived faults in the fiber under test. The retest count may differ from the fault count because, unlike the fault count, the retest count is not reset to zero if the fault count falls short of the predetermined number for generating an alarm condition. Past failures, even those which do not cause an alarm condition, are carried forward as part of the retest count. Following initiation of the scanning method, the retest count advances every time the associated fiber is retested due to a perceived fault. An excessive number of retest counts for any particular fiber may indicate a problem ancillary to the fiber itself, such as a problem with the switch in the OTAU used to establish a connection to the fiber.

The reference flag, the fault count, and the retest count are used to direct the sequence of operations depicted in the flowcharts. To initiate the scanning method in FIGS. 3A–B, the TSC 18 transmits a "SCAN START" command to the OMU 10 (step 70). As part of this command, the TSC 18 sends the control packet described in connection with FIG. 2. After initiating the scanning method, the reference flag, the fault count, and the retest count associated with each of the optical fibers are cleared (step 72).

Next, the scanning method includes a sequence of operations where the OMU 10 generates and stores a reference trace for each fiber by scanning the fibers in a round robin sequence. More specifically, the OMU 10 first probes a fiber under test to determine its length (step 74). In probing the fiber under test, the entire fiber is filled with light. Using a laser to emit light into the fiber, the laser must be switched on for a sufficient amount of time (e.g., 1 ms) that the entire fiber is filled with light. After filling the entire fiber with light, the power entering the input detector 48 is measured as a function of time. A noticeably large dropoff in power occurs at the discharge time, which corresponds to the time it takes light to travel the length of the fiber. The length of the fiber is calculated by multiplying the speed of light in the fiber by the discharge time. The speed of light in the fiber is equal to the speed of light "c" in a vacuum divided by the index of refraction of the fiber.

The inventors have discovered that the foregoing operations for determining the length of the fiber under test generate more accurate results than prior art methods which emit a short light pulse into the fiber instead of filling the fiber with light. In these prior art methods, power dropoffs occur at times associated with both discontinuities in the fiber and the end of the fiber. Sometimes, however, these power dropoffs are so similar that the discontinuity may incorrectly be considered the end of the fiber, thereby leading to a false calculation of the fiber length. In contrast, by filling the entire fiber under test with light, the power dropoff at the discharge time is much greater and well-defined than the power dropoffs associated with discontinuities so as to insure that the length of the fiber is properly determined.

After determining the length of the fiber under test, certain testing parameters are set for the fiber under test (step 76). These parameters include the fiber length, the pulse width, and the number of averages to be employed in the OTDR test. The pulse width and the number of averages are automatically adjusted based on fiber length thresholds. The longer the fiber, the longer the pulse width. In the preferred embodiment, the pulse width ranges from 40 ns for the shortest fibers to 10 µs for the longest fibers. In either case, the laser remains activated for a period of time shorter than the time it takes the light pulse to travel the length of the fiber under test. Similarly, the longer the fiber, the greater the number of averages. In the preferred embodiment, the number of averages typically ranges from 1000 for the shortest fibers to 2500 for the longest fibers. In some cases, however, the number of averages may be as low as 100 or as high as 5000. Each pulse emitted into a fiber generates a set of sample data points. Since it takes longer for a light pulse to traverse the length of a longer fiber than a relatively short fiber, it takes longer to generate a set of sample data points for the longer fiber. As the length of the fiber increases, the range value (i.e., laser pulsing interval) is increased.

Next, the OMU 10 conducts an OTDR test for the fiber under test (step 78). As stated above, an OTDR test is actually a series of individual tests averaged together. The series of light pulses emitted into the fiber generate respective sets of sample data points. The amount of time it takes to generate each set of sample data points is approximately 2 ms. Corresponding sample points from the generated sets are averaged together to generate a merged set of average sample points. Since the number of averages typically ranges from 1000 to 2500, the amount of time it takes to generate the merged set of average sample points typically ranges from two to five seconds. Due to the use of a relatively small number of averages (i.e., from 1000 to 2500), this merged set of average sample points would produce a fairly noisy trace with little value for purposes of locating a fault in a fiber. Therefore, in accordance with the present invention, the merged set of average sample points are further manipulated so as to "smooth out" the trace without increasing the number of averages.

Following the OTDR test, the merged set of average sample points are digitally enhanced by taking data beyond the end of the fiber under test to establish a DC reference point (step 80). In particular, the merged set of average sample points represents the power of reflected light at different locations along the length of the fiber under test. However, due to non-linear response characteristics of the amplifier 60 in FIG. 2, the merged set of average sample points is not linearly related to the power received at the input detector 48 in FIG. 2. To compensate for the non-linear amplifier response, data is taken beyond the end of the fiber under test to establish a DC reference point which is applied to the merged set of average sample points.

The OMU 10 next determines the number of sample points in the merged set of average sample points based on the fact that one sample point is taken for every four meters of fiber length (step 82). For example, if the fiber under test is 4000 meters in length, the number of sample points is approximately 1000 sample points.

An important feature of the scanning method is that the number of sample points be minimized so as to minimize memory usage. As a result, after determining the number of sample points in the merged set of average sample points, the merged set is compressed to less than 256 sample points (step 84). This data compression is accomplished by dividing the number of sample points in the merged set by 256 to obtain a compression ratio, and then "boxcar" averaging the sample points in the merged set using a window/group size equal to the compression ratio. To "boxcar" average the sample points, the sample points are divided into a plurality of groups of sample points with each group containing a plurality of adjacent sample points. The number of sample points in each group is equal to the compression ratio. The sample points in each group are then averaged together to generate a single trace data point representing each group. Thus, if the number of sample points in the merged set is determined to be 1000, the compression ratio is equal to 1000 divided by 256, which is rounded to four. The merged set of sample points is divided into groups of four sample points, and the four sample points in each group are averaged together to generate a single trace data point for each group. In an alternative embodiment, the number of sample points in each group differs in accordance with the signal-to-noise ratio in different portions of the fiber under test, so that a greater number of sample points are grouped together for those portions of the fiber exhibiting a relatively large amount of noise (i.e., having a relatively low signal-to-noise ratio) and a lesser number of sample points are grouped together for those portions of the fiber exhibiting a relatively small amount of noise (i.e., having a relatively large signal-to-noise ratio).

The trace data points obtained from boxcar averaging results in a smooth trace because grouping and averaging sample points effectively eliminates noise within the merged set of sample points. Noise within each group of sample points is eliminated by generating a single trace data point for each group. This, in turn, minimizes noise in the set of trace data points as a whole. If a particular sample point has a large amount of noise associated therewith, this noise effect will be diluted when averaging the sample point with other sample points in its group. In boxcar averaging, each of the sample points in the merged set of sample points is used to generate one of the trace data points. None of the sample points are merely discarded. As a result, the noise associated with a particular sample point is diluted during the data compression. It should be understood, however, that other methods of data compression may be used so long as each sample point does not excessively contribute to the value of a trace data point.

After generating the set of trace data points for the fiber under test, the reference flag associated with the fiber under test is checked (step 86). For the first pass through the scanning method, the reference flag is clear. Therefore, the set of trace data points are stored in the RAM 64 of the OMU 10 as a reference for future comparison (step 88). After the OMU 10 sets the reference flag associated with the fiber under test (step 90), the OMU 10 proceeds to the next fiber in the round robin sequence (step 92) so as to generate a reference set of trace data points for that fiber using the steps 74 through 90. In this manner, the OMU 10 generates reference traces for each of the fibers whose identifications were sent by the TSC 18 to the OMU 10 with the "SCAN START" command.

Once reference traces are stored in the RAM 64 for each optical fiber, the next pass through the scanning method checks the optical fibers for faults. More specifically, steps 74–84 of the scanning method generates a set of trace data points for the fiber under test. If the OMU 10 determines that the reference flag for that fiber 86 is set to indicate the existence of a stored reference trace (step 86), the newly generated set of trace data points are stored in the RAM 64 as a current trace (step 94).

This current trace is then compared to the reference trace associated with the fiber under test to determine whether or not a fault exists in the fiber. First, corresponding trace data points of the reference trace and the current trace are compared to determine whether or not the deviation between any corresponding points is greater than a predetermined threshold (e.g., 2 dBs) (step 96). If not, the scanning method advances to the next fiber in the round robin sequence (step 92). If, however, the deviation between the reference trace and the current trace is greater than the predetermined threshold for any corresponding trace data points, then the traces are compared to determine whether the deviation exists for "N" successive points (e.g., three successive points) (step 98). If the deviation does not exist for at least "N" successive points, then a fiber fault is not indicated and the scanning method proceeds to the next fiber (step 92). The rationale for this "successive point" threshold is that a fault should not be indicated unless it is certain that the fault exists. If the deviation does exist for "N" successive points, then both the retest count and the fault count are advance by one (step 100).

To avoid false indications of a fault in the fiber under test, the existence of a fault in the fiber must be confirmed a predetermined number of times. Therefore, prior to alarming the TSC 18 of the existence of the fault, the fiber is retested until a fault is indicated in "X" successive tests. Therefore, if the fault count is less than "X" (step 102), the scanning method retests the fiber by generating another current trace and comparing that current trace to the reference trace. If the fault count reaches "X" to indicate that a fault has been detected in "X" successive tests, the OMU 10 alarms the TSC 18 of the failed fiber (step 104). After alarming the TSC 18 of the failed fiber, the scanning method proceeds to the next fiber (step 92). Since the fault count for the failed fiber is now equal to "X", this failed fiber is skipped the next time the scanning method tests the failed fiber during the round robin scanning sequence (step 106).

If a fault is not detected in the fiber under test for "X" successive tests, then the scanning method advances to the next fiber (step 92). The next time the fiber is tested during the round robin sequence, the fault count is cleared (step 108) so that the fiber must once again fail "X" successive tests prior to initiating an alarm condition. In contrast, the retest count is not cleared prior to testing each fiber. The retest count, therefore, represents the number of total faults detected for the associated fiber from the initiation of the scanning method at step 70. If the retest count for the associated fiber is excessive, but no alarm condition has been generated for that fiber, the excessive retest count may indicate a problem ancillary to the fiber itself, such as a defective optical switch.

An alarm indication received at the TSC 18 may appear in the form of an "alarm box" or other alarm display. Once an alarm is received, the TSC 18 can conduct a more in depth fault location test to provide exact information regarding fault type and the location of the fault. Also, the TSC 18 may use industry standard protocol to communicate the alarm to other operation support (OS) computers. Another important aspect of the automated testing system is that in response to alarming the TSC 18 of a failed fiber, the TSC 18 is configured to automatically dial one or more pager phone numbers, using conventional Hayes style modem commands, in order to alert individuals outside the maintenance center of the alarm condition. The TSC 18 transmits a pager alert to one or more selected individuals associated with the fiber optic network where the problem has been detected. In addition, the TSC 18 may be configured to automatically initiate a facsimile transmission to preselected personnel in response to receipt of an alarm signal. The TSC 18 accomplishes this by generating a print command in response to the alarm signal. Using software such as WinFax Pro (v. 3.0) by Delrina of San Jose, Calif., the print command is converted to a facsimile command to initiate the facsimile transmission.

In the event of a power outage, reference and current trace data stored in the volatile RAM 64 is lost and the scanning method of FIGS. 3A–B is discontinued. Following the power outage, a command is send to the OMU 10 to restart the scanning method. In an alternative embodiment, the volatile RAM 64 is replaced with non-volatile memory so that trace data is not lost during a power outage. Also, the scanning method is automatically resumed following the power outage at the point at which it was stopped.

Figure 4:
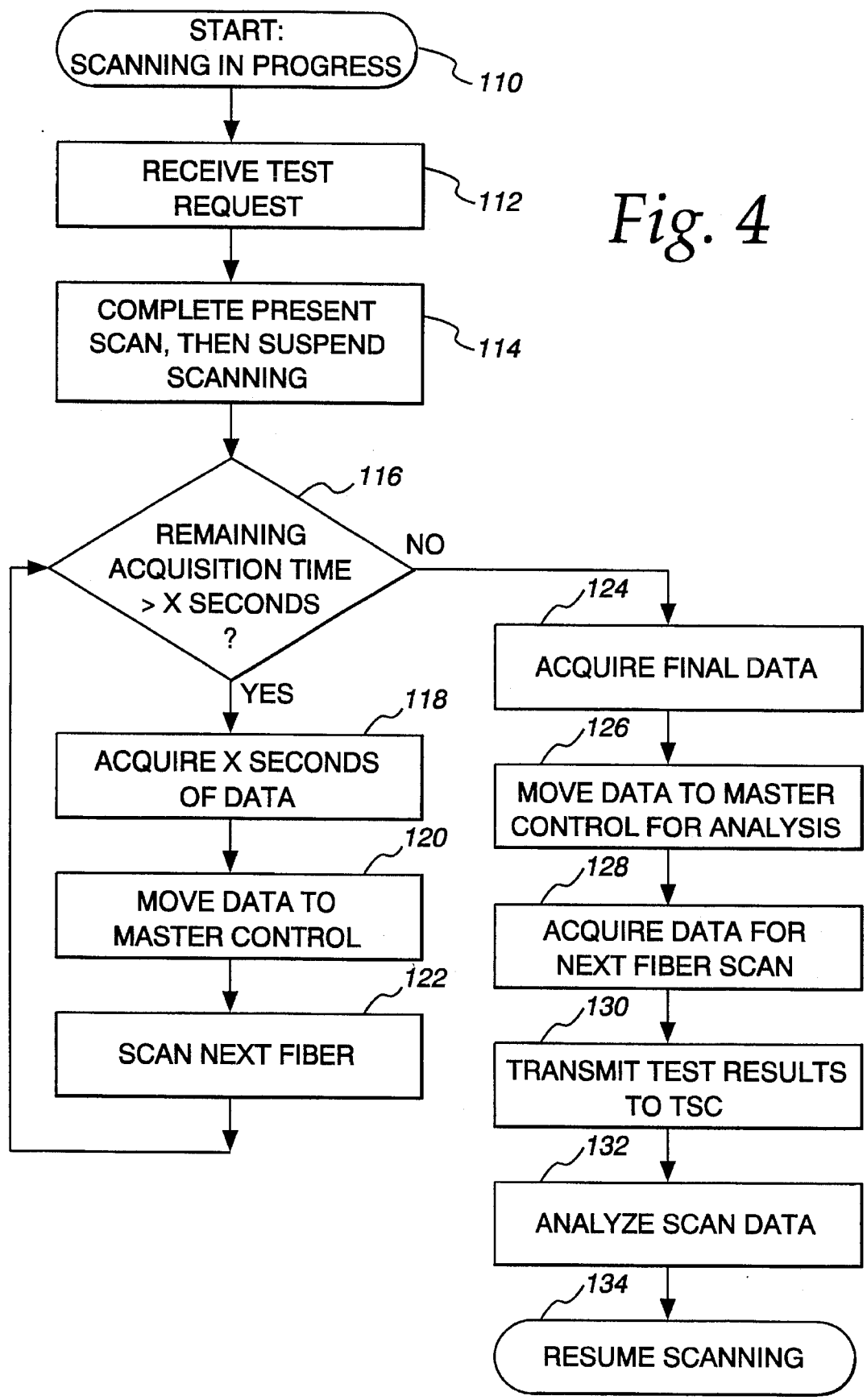
FIG. 4 is a flowchart of a method for interleaving scanning with other testing performed by the automated system in FIG. 1.

In accordance with another feature of the automated testing system, the scanning method in FIGS. 3A–B is interleaved with other TSC-initiated tests using the sequence of operations depicted in the flowchart of FIG. 4. By interleaving the scanning method with a TSC-initiated test, the scanning method is not fully suspended until after the TSC-initiated test is conducted. In addition, the interleaving process is transparent to the person requesting the TSC-initiated tests. Several functional characteristics of the automated testing system in FIG. 2 and the scanning method in FIGS. 3A–B are utilized to interleave the scanning method with a TSC-initiated test. First, the slave control 36 is capable of acquiring data independent of the master control 34 of the OMU 10. Second, the slave control 36 is capable of accumulating one minute's worth of ensemble-averaged data prior to being flushed by the master control 34. Third, the master control 34 is relatively idle while transmitting test results to the TSC 18. Fourth, in the scanning method, the slave control 36 performs the step of conducting an OTDR test to generate a merged set of ensemble-averaged sample points (step 78), while the master control 34 performs all other operations of the scanning method. Fifth, the maximum amount of time for scanning a single fiber in the scanning method is approximately five seconds. The foregoing functional characteristics permit the scanning method to be interleaved with a TSC-initiated test.

Referring now to FIG. 4, if the scanning method is in progress (step 110) and a TSC-initiated test request is received by the master control 34 (step 112), the scanning method completes the testing of the current fiber under test and temporarily suspends further scanning (step 114). The TSC-initiated test generally involves two operations: (1) the acquisition of data, and (2) the processing of the acquired data. The manner in which the scanning method is interleaved with the TSC-initiated test depends upon the amount of time remaining for the acquisition of data for the TSC-initiated test (step 116). If the remaining acquisition time is greater than "X" seconds (e.g., 30 seconds), where "X" seconds is some time period less than the one minute interval for storing data in the slave control 36, the slave control 36 acquires "X" second's worth of ensemble-averaged data for the TSC-initiated test and moves that acquired data to memory (steps 118 and 120). So that the scanning method does not remain suspended for an excessive period of time, the OMU 10 scans the next fiber in accordance with the scanning method in FIGS. 3A–B (step 122). Since the maximum amount of time for scanning the fiber is approximately five seconds, the scanning method delays the TSC-initiated test for only a short period of time. After scanning the fiber, the interleaving method returns to step 116 to determine whether the remaining acquisition time is still greater than "X" seconds (step 116). If the remaining acquisition time is greater than "X" seconds, the slave control 36 once again acquires "X" second's worth of ensemble-averaged data and moves that data to memory (steps 118 and 120). The OMU 10 then scans the next fiber in the round robin scanning sequence (step 122). For a TSC-initiated test involving several minutes of data acquisition, steps 118, 120, and 122 are performed several times until the remaining acquisition time is no longer greater than "X" seconds.

When the remaining data acquisition time for the TSC-initiated test is no longer greater than "X" seconds, the slave control 36 acquires the final set of data for the TSC-initiated test (step 124). Next, by virtue of the functional characteristics described above, the master control 34 processes the acquired data for the TSC-initiated test (step 126) and, at the same time, the slave control 36 performs an OTDR test for the next fiber in the round robin sequence in accordance with the scanning method (step 128). The master control 34 then transmits the results of the TSC-initiated test to the TSC 18 (step 130) and, at the same time, the master control 34 processes the data acquired in step 128 for the scanning method (step 132). Since the TSC-initiated test is now completed, the scanning method in FIGS. 3A–B is resumed (step 134).

It can be seen from the foregoing description of the interleaving process that the scanning method in FIGS. 3A–B is not fully suspended during a TSC-initiated test. Instead, the scanning method is interleaved with the TSC-initiated test by alternating the data acquisition operation of the TSC-initiated test with the scanning method (steps 118, 120, and 122) or by performing an OTDR test for a fiber as the master control 34 processes the data acquired for the TSC-initiated test (steps 126 and 128). In addition, since the master control 34 is relatively idle while transmitting test results to the TSC 18, the master control 34 processes the data acquired for the scanning method while simultaneously transmitting the results of the TSC-initiated test to the TSC 18 (steps 130 and 132).

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A method for rapidly scanning a fiber optic network for faults comprising:

(a) emitting a predetermined number of optical pulses into an optical fiber under test, said predetermined number being minimally sufficient to allow detection of a fault in the fiber under test;

(b) detecting reflected light for each of said optical pulses, and converting the reflected light into an electrical signal for each of said optical pulses;

(c) sampling said electrical signal for each of said optical pulses to generate sets of sample data points associated with said respective optical pulses;

(d) averaging corresponding points of said sets of sample data points to obtain a merged set of average sample data points;

(e) compressing said merged set of average sample data points to obtain a current set of trace data points, said compressing including dividing said merged set of average sample data points into a plurality of groups of adjacent sample data points, and averaging the adjacent sample data points in each of said groups to obtain a single trace data point for each of said groups; and (f) comparing said current set of trace data points with a reference set of trace data points to determine whether or not a fault exists in the fiber under test.

2. The method of claim 1, further including a step of determining the number of sample points in said merged set of average sample data points, and wherein the number of adjacent sample data points in each of said groups is approximately equal to the number of sample points in said merged set divided by a predetermined number of trace data points.

3. The method of claim 2, wherein the sample points in said merged set of average sample data points are associated with spaced locations in the fiber under test, and wherein said step of determining the number of sample points in said merged set of average sample data points includes dividing the length of the fiber under test by the distance between said sample points.

4. The method of claim 2, wherein said predetermined number of trace data points is less than or equal to 256.

5. A method for rapidly scanning a fiber optic network for faults, comprising:
(a) emitting a predetermined number of optical pulses into an optical fiber under test, said predetermined number being minimally sufficient to allow detection of a fault in the fiber under test;
(b) detecting reflected light for each of said optical pulses, and converting the reflected light into an electrical signal for each of said optical pulses;
(c) sampling said electrical signal for each of said optical pulses to generate sets of sample data points associated with said respective optical pulses;
(d) averaging corresponding points of said sets of sample data points to obtain a merged set of average sample data points;
(e) compressing said merged set of average sample data points to obtain a current set of trace data points;
(f) comparing said current set of trace data points with a reference set of trace data points to determine whether or not a fault exists in the fiber under test; and
(g) determining the length of the fiber under test, said determining including emitting light from a light source into the fiber under test via one end thereof for a sufficient amount of time to fill the fiber under test with the light, and measuring the time for the light to be discharged from the one end of the fiber under test after the light source is turned off.

6. The method of claim 5, wherein said step of determining the length of the fiber under test includes multiplying the speed of light in the fiber under test by the amount of time for the light to be discharged from the fiber under test.

7. A method for rapidly scanning a fiber optic network for faults, comprising:
(a) emitting a predetermined number of optical pulses into an optical fiber under test, said predetermined number being minimally sufficient to allow detection of a fault in the fiber under test;
(b) detecting reflected light for each of said optical pulses, and converting the reflected light into an electrical signal for each of said optical pulses;
(c) sampling said electrical signal for each of said optical pulses to generate sets of sample data points associated with said respective optical pulses;
(d) averaging corresponding points of said sets of sample data points to obtain a merged set of average sample data points;
(e) compressing said merged set of average sample data points to obtain a reference set of trace data points, said compressing including dividing said merged set of average sample data points into a plurality of groups of adjacent sample data points, and averaging the adjacent sample data points in each of said groups to obtain a single trace data point for each of said groups;
(f) repeating steps (a) through (e) to obtain a current set of trace data points; and
(g) comparing said current set of trace data points with said reference set of trace data points to determine whether or not a fault exists in the fiber under test.

8. The method of claim 7, further including a step of determining the number of sample points in said merged set of average sample data points, and wherein the number of adjacent sample data points in each of said groups is approximately equal to the number of sample points in said merged set divided by a predetermined number of trace data points.

9. A method for rapidly scanning a fiber optic network for faults, comprising:
(a) emitting a predetermined number of optical pulses into an optical fiber under test, said predetermined number being minimally sufficient to allow detection of a fault in the fiber under test;
(b) detecting reflected light for each of said optical pulses, and converting the reflected light into an electrical signal for each of said optical pulses;
(c) sampling said electrical signal for each of said optical pulses to generate sets of sample data points associated with said respective optical pulses;
(d) averaging corresponding points of said sets of sample data points to obtain a merged set of average sample data points;
(e) compressing said merged set of average sample data points to obtain a reference set of trace data points;
(f) repeating steps (a) through (e) to obtain a current set of trace data points;
(g) comparing said current set of trace data points with said reference set of trace data points to determine whether or not a fault exists in the fiber under test; and
(h) determining the length of the fiber under test, said determining including emitting light from a light source into the fiber under test via one end thereof for a sufficient amount of time to fill the fiber under test with the light, and measuring the time for the light to be discharged from the one end of the fiber under test after the light source is turned off.

10. An apparatus for rapidly scanning a fiber optic network, comprising:
a light source for emitting a predetermined number of optical pulses into an optical fiber under test, said predetermined number being minimally sufficient to allow detection of a fault in the fiber under test;
a detector for detecting reflected light for each of said optical pulses and converting the reflected light into an electrical signal for each of said optical pulses;
a sampling circuit, coupled to said detector, for sampling said electrical signal for each of said optical pulses to generate sets of sample data points associated with said respective optical pulses;
a memory for storing a reference set of trace data points; and
a signal processor for averaging corresponding points of said sets of sample data points to obtain a merged set of average sample data points, compressing said merged set of average sample data points to obtain a current set of trace data points, said compressing including dividing said merged set of average sample data points into a plurality of groups of adjacent sample data points, and averaging the adjacent sample data points in each of said groups to obtain a single trace data point for each of said groups, and comparing said current set of trace data points with said reference set of trace data points to determine whether or not a fault exists in the fiber under test.

11. The apparatus of claim 10, wherein said signal processor determines the number of sample points in said merged set of average sample data points, and wherein the number of adjacent sample data points in each of said groups is approximately equal to the number of sample data points in said merged set divided by a predetermined number of trace data points.

12. The apparatus of claim 11, wherein the sample points in said merged set of average sample data points are associated with spaced locations in the fiber under test, and wherein said signal processor determines the number of sample points in said merged set of average sample data points by dividing the length of the fiber under test by the distance between said sample points.

13. The apparatus of claim 11, wherein said predetermined number of trace data points is less than or equal to 256.

14. An apparatus for rapidly scanning a fiber optic network, comprising:

a light source for emitting a predetermined number of optical pulses into an optical fiber under test, said predetermined number being minimally sufficient to allow detection of a fault in the fiber under test, said emitting a predetermined number of optical pulses including emitting light into the fiber under test via one end thereof for a sufficient amount of time to fill the fiber under test with the light;

a detector for detecting reflected light for each of said optical pulses and converting the reflected light into an electrical signal for each of said optical pulses;

a sampling circuit, coupled to said detector, for sampling said electrical signal for each of said optical pulses to generate sets of sample data points associated with said respective optical pulses;

a memory for storing a reference set of trace data points; and a signal processor for averaging corresponding points of said sets of sample data points to obtain a merged set of average sample data points, compressing said merged set of average sample data points to obtain a current set of trace data points, comparing said current set of trace data points with said reference set of trace data points to determine whether or not a fault exists in the fiber under test, and determining the length of the fiber under test, said determining including measuring the time for the light to be discharged from the one end of the fiber under test after the light source is turned off.

15. The apparatus of claim 14, wherein said signal processor multiplies the speed of light in the fiber under test by the amount of time for the light to be discharged from the fiber under test.

* * * * *